(12) United States Patent
Buentello et al.

(10) Patent No.: US 12,394,031 B1
(45) Date of Patent: Aug. 19, 2025

(54) SYSTEMS AND METHODS FOR SENSOR-BASED DETECTION OF PROPERTY DAMAGE

(71) Applicant: United Services Automobile Association (USAA), San Antonio, TX (US)

(72) Inventors: Andre Rene Buentello, San Antonio, TX (US); Gregory David Hansen, San Antonio, TX (US); Justin Royell Nash, Little Elm, TX (US); Nathan Lee Post, Rockport, TX (US); Jose L. Romero, Jr., San Antonio, TX (US); Brian Francisco Shipley, Plano, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 449 days.

(21) Appl. No.: 17/739,921

(22) Filed: May 9, 2022

Related U.S. Application Data (60) Provisional application No. 63/186,526, filed on May 10, 2021.

(51) Int. Cl.
*G06T 7/00* (2017.01)
*G06Q 40/08* (2012.01)
*G06V 20/00* (2022.01)
*G06V 20/70* (2022.01)

(52) U.S. Cl.
CPC ........... *G06T 7/0002* (2013.01); *G06Q 40/08* (2013.01); *G06V 20/35* (2022.01); *G06V 20/70* (2022.01); *G06T 2207/10052* (2013.01)

(58) Field of Classification Search
CPC .......... G06T 7/0002; G06T 2207/10052; G06T 7/0004; G06T 7/001; G06T 2207/10028; G06V 20/35; G06V 20/70; G06V 20/36; G06Q 40/08
See application file for complete search history.

(56) References Cited

U.S. PATENT DOCUMENTS

| 8,515,152 B2 * | 8/2013 | Siri ........................... B60S 5/00 |
| | | 382/141 |
| 10,007,992 B1 * | 6/2018 | Harvey ................. G06V 20/182 |
| 10,137,984 B1 * | 11/2018 | Flick ......................... G08G 5/74 |

(Continued)

OTHER PUBLICATIONS

R. Roy and K. T. George, "Detecting insurance claims fraud using machine learning techniques," 2017 International Conference on Circuit ,Power and Computing Technologies (ICCPCT), Kollam, India, 2017, pp. 1-6, doi: 10.1109/ICCPCT.2017.8074258 (Year: 2017).*

*Primary Examiner* — Vu Le
*Assistant Examiner* — Jack Peter Kraynak
(74) *Attorney, Agent, or Firm* — Fletcher Yoder, P.C.

(57) ABSTRACT

A system includes one or more processors configured to receive one or more sets of LIDAR sensor data corresponding to damage of a property. The system is configured to analyze the one or more sets of LIDAR sensor data and determine a repair recommendation and recommended time period of repair for the associated damage of the property. The system may also detect changes to property condition over time and monitor condition of the property over time via LIDAR sensors and alert the user when property condition decreases and a repair is recommended.

18 Claims, 2 Drawing Sheets

(56) References Cited

U.S. PATENT DOCUMENTS

| | | | | |
|---|---|---|---|---|
| 10,489,813 | B1* | 11/2019 | De Guia | G06Q 30/0217 |
| 10,657,707 | B1* | 5/2020 | Leise | G06T 17/00 |
| 11,216,690 | B2* | 1/2022 | Guo | G06N 3/08 |
| 2009/0265193 | A1* | 10/2009 | Collins | G06Q 30/0185 |
| | | | | 901/46 |
| 2017/0024823 | A1* | 1/2017 | Andrade | G06Q 40/08 |
| 2017/0076408 | A1* | 3/2017 | D'Souza | G06Q 20/10 |
| 2017/0148102 | A1* | 5/2017 | Franke | G06Q 30/0601 |
| 2017/0352100 | A1* | 12/2017 | Shreve | G06T 7/168 |
| 2020/0402178 | A1* | 12/2020 | Brandmaier | H04N 23/632 |
| 2021/0241439 | A1* | 8/2021 | Lutich | G06V 10/764 |
| 2022/0335382 | A1* | 10/2022 | Sanchez | G06V 20/10 |

\* cited by examiner

FIG. 1

FIG. 2 ively small number of claims (e.g., thousands, tens of thousands, or more), the insurance provider may utilize many inspectors to keep up with requests to assess the condition of the properties. However, this process may still be time consuming, as an inspector may need to travel to each of the properties to assess the condition of the properties. Accordingly, it is now recognized that it is desirable to utilize sensors, such as LIDAR sensors (e.g., on a mobile device), that may send sensor data indicative of the condition of the property to enable a user (e.g., inspector, property owner) to view an accurate representation of the damage to the property without having an inspector physically visit the property or without having to transport the property to another location for inspection.

SYSTEMS AND METHODS FOR SENSOR-BASED DETECTION OF PROPERTY DAMAGE

CROSS-REFERENCE TO RELATED APPLICATION

This application claims priority to and the benefit of U.S. Provisional Application No. 63/186,526, entitled "SYSTEMS AND METHODS FOR SENSOR-BASED DETECTION OF PROPERTY DAMAGE," filed May 10, 2021, which is hereby incorporated by reference in its entirety for all purposes.

BACKGROUND

The present disclosure relates generally to systems and methods for utilizing sensors, such as Light Detection and Ranging (LIDAR) sensors, to determine a condition of a property. More specifically, the present disclosure relates to generating and analyzing sensor data, such as LIDAR sensor data, to determine the condition of the property and estimated repair information.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Inspection of a condition of a property (e.g. dwelling, vehicle, appliance, equipment) of an insurance holder and/or an owner for the purposes of determining a type of repair that is appropriate and/or a repair cost is generally performed through an in-person, physical inspection of the property by an inspector. For example, the inspector may travel to the property to inspect damage to the property and to determine the repair cost corresponding to the damage to the property. However, it is now recognized that various advantages may be gained by enabling a user (e.g., inspector, owner) to view an accurate representation of the damage to the property without having an inspector physically visit the property or without having to transport the property to another location for inspection.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system includes one or more processors, memory storing instructions executable by the one or more processors to cause the one or more processors to receive, from one or more Light Detection and Ranging (LIDAR) sensors, sensor data indicative of damage to a property. Additionally, the processors determine property condition data related to the damage to the property based on the sensor data, and determine an appropriate repair and a recommended time frame for completion of the appropriate repair based on the property condition data.

In an additional embodiment, a method includes receiving, via one or more processors, one or more sets of sensor data from one or more Light Detection and Ranging (LIDAR) sensors, wherein the one or more sets of sensor data correspond to damage of a property. The method further includes determining, via the one or more processors, depth data associated with the one or more sets of sensor data, and determining, via the one or more processors, property condition data related to the damage of the property based at least in part on the depth data. Additionally, the method includes determining, via the one or more processors, an appropriate repair and a cost to repair the damage of the property based at least in part on the property condition data, and instructing, via the one or more processors, display of a recommendation of the appropriate repair and the cost to repair the damage on a mobile device.

In another embodiment, a system includes one or more processors, memory storing instructions executable by the one or more processors to cause the one or more processors to receive one or more sets of sensor data from one or more Light Detection and Ranging (LIDAR) sensors, wherein the one or more sets of sensor data correspond to damage of a property at a first time. Further, the processors determine a recommended repair and a recommended time frame for completion of the recommended repair based on the one or more sets of sensor data, and receive one or more additional sets of sensor data from the one or more LIDAR sensors, wherein the one or more additional sets of sensor data correspond to the damage of the property at a second time. Additionally, the processors determine, based on the one or more sets of sensor data and the additional one or more sets of sensor data, a percent change in the damage of the property between the first time and the second time, and determine an updated recommended repair and an updated recommended time frame for completion of the recommended repair based on the percent change in the damage of the property.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As noted above, existing techniques to conduct an inspection of a condition of a property (e.g. dwelling, vehicle, appliance, equipment) for the purposes of determining a type of repair and/or a repair cost may involve an inspector traveling to the property and/or an owner transporting the property to an inspection location. Additionally, such existing techniques are not well-suited to monitoring a condition of a property over time, as the inspector would need to make multiple visits to the property and/or the owner would transport the property to the inspection location multiple times. For example, the inspector would need to make multiple visits to the property to identify that original damage affected other portions of the property and/or that the condition of the property has worsened as a result of the original damage. However, it is now recognized that various advantages may be gained by enabling a user (e.g., inspector, owner) to obtain accurate and up-to-date information related to a condition of a property via a sensor system, such as a Light Detection and Ranging (LIDAR) system, without having an inspector physically visit the property or without having to transport the property to another location.

Accordingly, the present embodiments relate to the LIDAR system and associated methods for analyzing LIDAR data (e.g. dimensional data, depth data, volume data, and/or geometric data) collected by one or more LIDAR sensors to determine damage to a property, a condition of the property, a recommended repair, and a cost of the recommended repair, a time period for initiating the recommended repair, or any combination thereof. The LIDAR system, along with certain property condition data (e.g., dimensions of scratches or dents) that may be derived from the LIDAR data collected by the one or more LIDAR sensors of the LIDAR system, may be provided to the user to facilitate remote inspection of the property and/or other operations.

To generate the LIDAR data, the LIDAR system may include the one or more LIDAR sensors that collect depth data for the property and/or a segment of the property. The LIDAR system may include a computing system that utilizes the depth data to develop a 3D model of the property. The LIDAR system may also communicate with a database to compare the collected LIDAR data for the property with previous LIDAR data attained by the LIDAR system (e.g., previous depth data of scratches, dents, and/or other property damage, and associated repair data and costs for the scratches, dents and/or other property damage). Thus, the present embodiments may provide a flexible, on-demand (e.g., 24-hour access) way to visualize and/or assess the property, which may enable efficient and accurate decisions by the owner and/or other interested party (e.g., an insurance provider) related to repair or replacement of the property. Furthermore, the LIDAR system may enable efficient validation of an insurance damage claim and/or facilitate insurance premium rate setting by the insurance provider. Additional details regarding the LIDAR system and associated methods are discussed in detail below with reference to FIG. 1 and FIG. 2.

Figure 1:
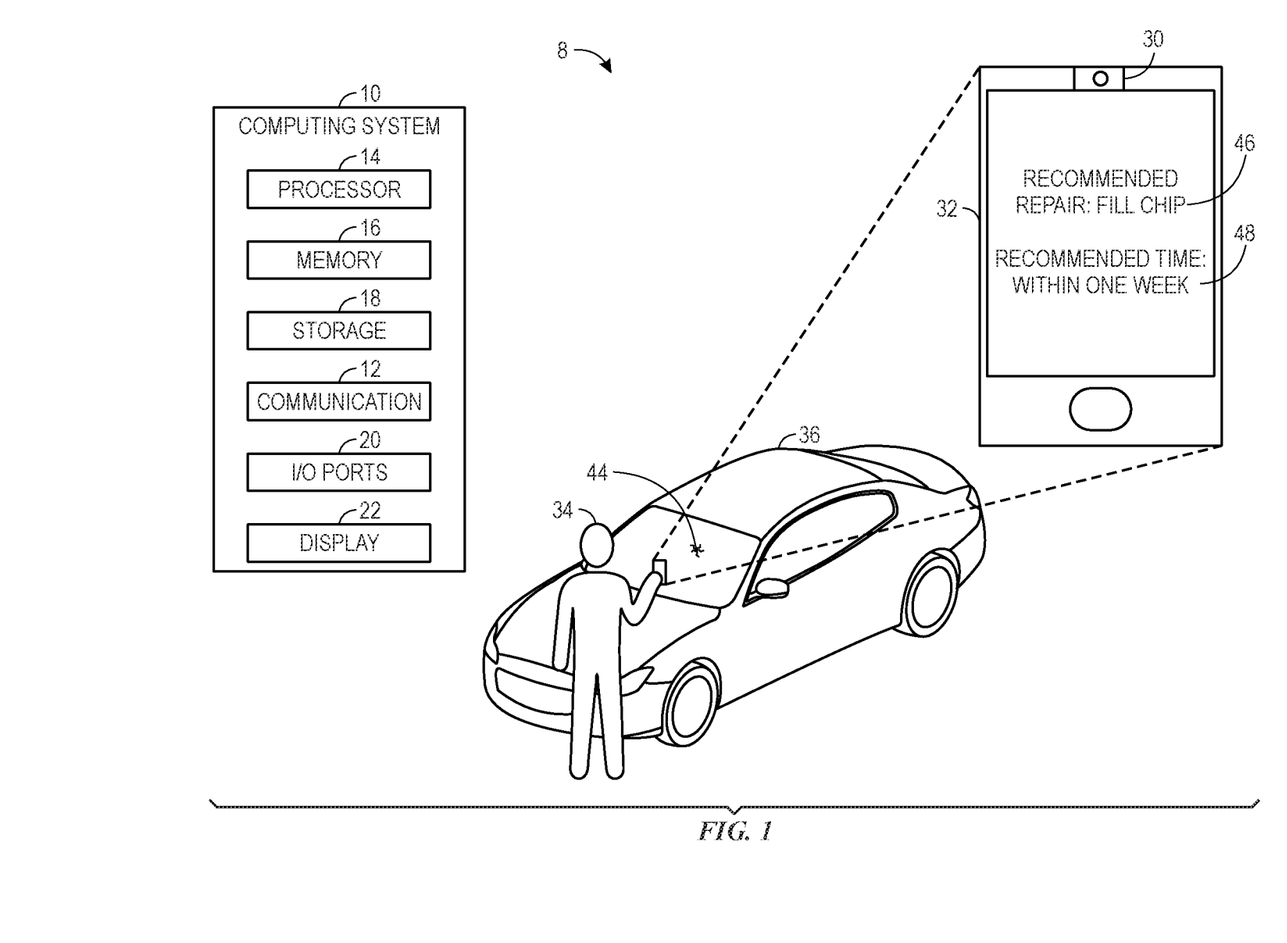
FIG. 1 illustrates a Light Detection and Ranging (LIDAR) system that is configured to detect a condition of a property, in accordance with an embodiment of the present disclosure.

With the foregoing in mind, FIG. 1 is a schematic diagram of a system 8 (e.g., LIDAR system) having a computing system 10 (e.g., LIDAR computing system) communicatively coupled to a variety of data sources that may assist the computing system 10 in determining property condition data. The property condition data may be utilized by an owner and/or other interested party (e.g., an insurance provider) to make decisions related to repair or replacement of the property. The computing system 10 may include any suitable computer device, such as a general-purpose personal computer, a laptop computer, a tablet computer, a mobile computer, or the like that is configured in accordance with present embodiments. The computing system 10 may include a distributed computing system (e.g., with multiple computer devices) and/or a cloud computing system. The computing system 10 may include various types of components that may assist the computing system 10 in performing various types of tasks and operations described herein. For example, the computing system 10 may include a communication component 12, a processor 14, a memory 16, a storage 18, input/output (I/O) ports 20, a display 22, and the like. The communication component 12 may be a wireless or wired communication component that may facilitate communication between the computing system 10, the data sources, and various other computing systems via a network (e.g., the Internet). The processor 14 may be any type of computer processor or microprocessor capable of executing computer-executable code. The processor 14 may also include multiple processors that may perform the operations described herein.

The memory 16 and the storage 18 may be any suitable articles of manufacture that can serve as media to store processor-executable code, data, or the like. These articles of manufacture may represent computer-readable media (e.g., any suitable form of memory or storage) that may store the processor-executable code used by the processor 14 to perform the presently disclosed techniques. As used herein, applications may include any suitable computer software or program that may be installed onto the computing system 10 and executed by the processor 14. The memory 16 and the storage 18 may represent non-transitory computer-readable media (e.g., any suitable form of memory or storage) that may store the processor-executable code used by the processor 14 to perform various techniques described herein. It should be noted that non-transitory merely indicates that the media is tangible and not a signal.

The I/O ports 20 may be interfaces that may couple to other peripheral components, such as input devices (e.g., keyboard, mouse), sensors, input/output (I/O) modules, and the like. The display 22 may operate as a human machine interface (HMI) to depict visualizations associated with software or executable code being processed by the processor 14. In one embodiment, the display 22 may be a touch display capable of receiving inputs from a user of the computing system 10. The display 22 may be any suitable type of display, such as a liquid crystal display (LCD), plasma display, or an organic light emitting diode (OLED) display, for example. Additionally, in one embodiment, the display 22 may be provided in conjunction with a touch-sensitive mechanism (e.g., a touch screen) that may function as part of a control interface for the computing system 10. It should be noted that the components described herein with regard to the computing system 10 are examples and the computing system 10 may include additional or fewer components relative to the illustrated embodiment.

In certain embodiments, the computing system 10 may be communicatively coupled to a network, which may include collections of computing systems, the Internet, an Intranet system, or the like. The network may facilitate communication between the computing system 10 and various other data sources. For instance, the network may be communicatively coupled to a mobile device (e.g., owner mobile device) and/or the system 8 (e.g., provider imaging system) that may be used to capture depth data (e.g., of the property). In some embodiments, the network may be communicatively coupled to one or more databases, which may store data regarding property conditions, such as damage dimensions, repair costs, property types, and/or other information relevant to property conditions and property claim comparisons. In some embodiments, the one or more databases may organize the property condition data based on property type (e.g., dwelling, vehicle, equipment, appliance), damage type (e.g., scratches, dents, front-end damage, rear-end damage, cracks), and/or any other category of the property condition data. In addition, the one or more databases may include an exposed application programming interface (API) that provides data services regarding property conditions and property claim comparisons. The one or more databases may conduct ongoing updates to add additional property condition data to the one or more databases based on multiple individuals completing repairs. This enables the one or more databases to contain the most updated historical data regarding property conditions and facilitates more accurate repair recommendations to be determined via the system 8.

Referring back to the system 8, the system 8 may include one or more LIDAR sensors 30 that are configured to capture data (e.g., LIDAR data, dimensional data, depth data, volume data, geometric data) associated with the property. The data may be utilized to determine damage to the property and/or to determine a recommended repair for the property. In some embodiments, a user 34 (e.g., the owner and/or another individual, such as an inspector for the insurance provider) may utilize a mobile device 32, such as a phone, tablet, or any other electronic device, to implement the system 8. The mobile device 32 may be portable and configured to be carried and/or held by the user 34. The mobile device 32 may include or be coupled to the one or more LIDAR sensors 30. It should be appreciated that the one or more LIDAR sensors 30 may be physically coupled to the mobile device 32; however, the one or more LIDAR sensors 30 may instead by physically separated from the mobile device 32 and communicatively (wirelessly) coupled to the mobile device 32. For example, the one or more LIDAR sensors 30 may be mounted to a portion of the property, such as within a passenger compartment of a vehicle or within a room of a building. In some embodiments, at least one of the one or more LIDAR sensors 30 is physically coupled to the mobile device 32, while at least one of the one or more LIDAR sensors is physically separated from the mobile device 32 and communicatively (wirelessly) coupled to the mobile device 32. The mobile device 32 may have one or more processors and any other components (e.g., memory, storage, communication, and/or display) that have similar operational features as described herein with respect to the computing system 10. The mobile device 32 may be communicatively coupled to the computing system 10 to carry out the techniques disclosed herein.

At certain times, the user 34 of the system 8 may desire to assess damage to the property. In some embodiments, in response to an input (e.g., from the user 34 via the mobile device 32) indicating that the user 34 would like to assess the damage to the property, the computing system 10 may instruct display (e.g., on a display of the mobile device 32) of a prompt to the user 34 to select an area of the property that the user 34 desires to inspect for damage and/or a prompt to the user 34 to orient the one or more LIDAR sensors 30 in a particular way to enable the one or more LIDAR sensors 30 to collect data indicative of the damage to the property. For example, with reference to FIG. 1, the property may be a vehicle 26, and the damage may be a crack, dent, chip or any other property damage. Furthermore, if the one or more LIDAR sensors 30 are physically coupled to the mobile device 32, the user 34 may orient the one or more LIDAR sensors 30 by holding the mobile device 32 in a particular position relative to the property. If the one or more LIDAR sensors 30 are physically separated from the mobile device 32 and are coupled to the property instead, the user 34 may orient the one or more LIDAR sensors 30 by providing control inputs via the mobile device 32. In some such cases, the computing system 10 may receive the control inputs and then instruct actuators associated with the one or more LIDAR sensors 30 based on the control inputs to position (e.g., to move, such as to rotate and/or translate) the one or more LIDAR sensors 30 in the particular position relative to the property.

The one or more LIDAR sensors 30 are configured to collect depth and dimensional data corresponding to the damaged area of the property. The computing system 10 may receive the data and may query one or more databases having depth and dimensional data of multiple properties and corresponding repair data associated with the multiple properties. The computing system 10 may utilize a property type to identify one or more properties of the multiple properties in the one or more databases that correspond to the property type. The computing system 10 may also identify one or more properties of the multiple properties in the one or more databases that have respective data that correspond to the data for the property. In this way, the computing system 10 may identify similar properties that have similar data (e.g., from previous damage). The system 8 may then display a notification, which may be presented on the display of the mobile device 32 and/or some other display 22 of the computing system 10 for visualization by the user 34. The notification may include a recommendation 46 for a repair and a time period 48 in which the repair should be completed (e.g. the time period until the damage may worsen) based on the repair data in the one or more databases.

With reference to FIG. 1, the vehicle 36 may have a crack 44 in a front dashboard of the vehicle 36. The user 34 may desire to obtain a recommendation including a suggested time period for repairing the crack 44 (e.g., time period before the crack will worsen and/or the repair cost will increase). Advantageously, the user 34 may obtain this information via the system 8 without having to bring the vehicle 36 to a physical store for inspection or without having to call in a specialist to the location of the vehicle 36.

In some embodiments, the user 34 may be prompted to direct or to point the one or more LIDAR sensors 30 toward the crack 44. The one or more LIDAR sensors 30 may then collect depth and dimensional data for the crack 44 in the front dashboard of the vehicle 36. The computing system 10 may determine the recommended repair and the time period by querying the one or more databases comprising respective data for multiple vehicles. The computing system 10 may identify one or more of the multiple vehicles that correspond to the vehicle, such as one or more of the multiple vehicles that have a vehicle type that corresponds to the vehicle (e.g., a compact vehicle; a luxury vehicle; a same make and/or model vehicle). The computing system 10 may also identify one or more of the multiple vehicles with similar damage data (e.g., damage type; depth and dimensional data). Then, the computing system 10 may access an associated repair and time period corresponding to the one or more of the multiple vehicles that are identified as corresponding to the vehicle type and/or having the similar damage data. The computing system 10 may use one or more algorithms (e.g., machine learning algorithms) to determine and to transmit a notification with the recommendation 46 for the repair and the time period 48 to the mobile device 32 associated with the user 34. It should be appreciated that the computing system 10 may also calculate and generate the notification to include an average price of the repair in the vicinity of the vehicle 36, recommended repair shops (e.g., repair or supply shops) in the vicinity, and/or any other related information. For example, the notification may include a map with a route overlaid onto the map, wherein the route extends from a current location of the user 34 (e.g., based on location data obtained from the mobile device 32) to a closest recommended repair shop. In some cases, the user 34 may select one of the recommended repair shops, and then the computing system 10 may generate and output the map with the route from the current location of the user 34 to the selected recommended repair shop. In any case, upon identifying the closest recommended repair shop, upon selection of the selected recommended repair shop, and/or upon detecting that the user 34 is traveling along the route, the computing system 10 may initiate transfer of the damage data and/or other details related to the property (e.g., make, model, owner name, insurance company name) to the closest/selected recommended repair shop. In this way, the computing system 10 may alert the closest/selected recommended repair shop in advance of arrival of the user 34 (who may be traveling with or without the property, depending on the repairs for the property).

As noted herein, the one or more databases may include data related to repair costs to repair similar damage (e.g., having the similar damage data) and/or to repair similar damage to similar types of vehicles. For example, the user 34 may input a particular make and model of the vehicle 36 with the crack 44 on the front dashboard, and the computing system 10 may access one or more records for damage repair costs in the one or more databases for the same or similar make and model vehicle for repair to a similar crack on the front dashboard (e.g., similar dimensions or volume). The computing system 10 may determine an average or median of the damage repair costs, and then utilize the average or median of the damage repair costs to determine an appropriate damage repair cost (e.g., the appropriate damage repair cost may be the average or median of the damage repair costs, or within some percentage, such as within 5, 10, 15, or 20 percent of the average or median of the damage repair costs, and the percentage may vary due to variations in the damage or market area). The computing system 10 may also implement algorithms (e.g., machine learning algorithms) to determine a predicted repair cost and/or repair recommendation. The algorithms may be trained on and/or contain variables determined by historical repair data stored in the one or more databases. The one or more databases may be dynamically updated to include repair data associated with recent repairs completed by multiple individuals. The algorithms may be updated and/or update the variables utilized based on the updated property damage and repair data stored in the one or more databases. The one or more databases may also be updated to include the user's property damage data and repair data when the user completes the repair (e.g., automatically in response to completion of the repair). It should be appreciated that these techniques to determine the repair cost may be applied to any property type associated with the user.

The system 8 may also be considered to be part of or to include an insurance system for the insurance provider for the property. In such cases, the system 8 may provide a quote or coverage related to the damage to the property to the user 34. The insurance provider may also utilize the collected LIDAR sensor data to perform its own inspection of the property and/or to recommend multiple repair options. Thus, the computing system 10 may store and/or display the appropriate damage repair cost via the display 22 or another display. In some embodiments, the computing system 10 may transmit data including the appropriate damage repair cost, along with the property condition data determined from the LIDAR sensor data, to the one or more databases. The computing system 10 may update the one or more databases based on the property condition data. In this manner, the one or more databases may include a collection of LIDAR sensor data and corresponding property condition data that may be used by the computing system 10 and/or the insurance provider to determine the appropriate damage repair cost. As previously mentioned, the property condition data within the one or more databases may be organized based on the property type and/or the damage type, or based on any other category related to the property condition data. This may enable quicker and more accurate comparison of the current property damage to previous damage to similar property types.

In some embodiments, the one or more databases update the depth and dimensional data and the corresponding property condition data by the computing system 10, or another computing system. Because the one or more databases is updated to store the depth and dimensional data and corresponding property condition data for many different property types, the computing system 10, or another computing system, may determine common types of damage for certain types of properties (e.g., houses, vehicles, appliances) and may set an insurance premium rate for each property type in view of common types of damage to the property type. The computing system 10 may determine whether the repair cost in the insurance damage claim or the claim itself is erroneous or fraudulent based on the comparison of the LIDAR sensor data and the associated property condition data with previous LIDAR sensor data and property condition data and/or based on the determined damage repair cost. For example, if the quoted damage repair cost in the insurance damage claim is significantly higher (e.g., more than 5, 10, 15, 20, or 25 percent higher) than damage repair costs (e.g., an average or a median) in the database of similar damage to similar property types, then the computing system 10 may determine that the current property damage claim is erroneous or fraudulent. As another example, if the quoted damage repair cost in the vehicle damage claim is significantly higher (e.g., more than 5, 10, 15, 20, or 25 percent higher) than the damage repair cost determined, then the computing system 10 may determine that the current insurance damage claim is erroneous or fraudulent. The computing system 10 may update the database based on the fraud determination. As such, the updated database may be used by the computing system 10 to subsequently recognize erroneous or fraudulent claims and/or repair facilities charging inappropriate repair costs.

The system 8 may also enable creation of 3D models of the property using the LIDAR sensor data. The system 8 may collect depth or dimensional data corresponding to damage to a property and the surrounding area of the property by implementing one or more LIDAR sensors 30. The sensor data may be utilized by the system to develop a 3D model of a portion of the property surrounding the damaged portion of the property. This 3D model may be sent to an insurance inspector or technician to get a quote and/or adjustment without the physical property being present in a certain location.

Figure 2:
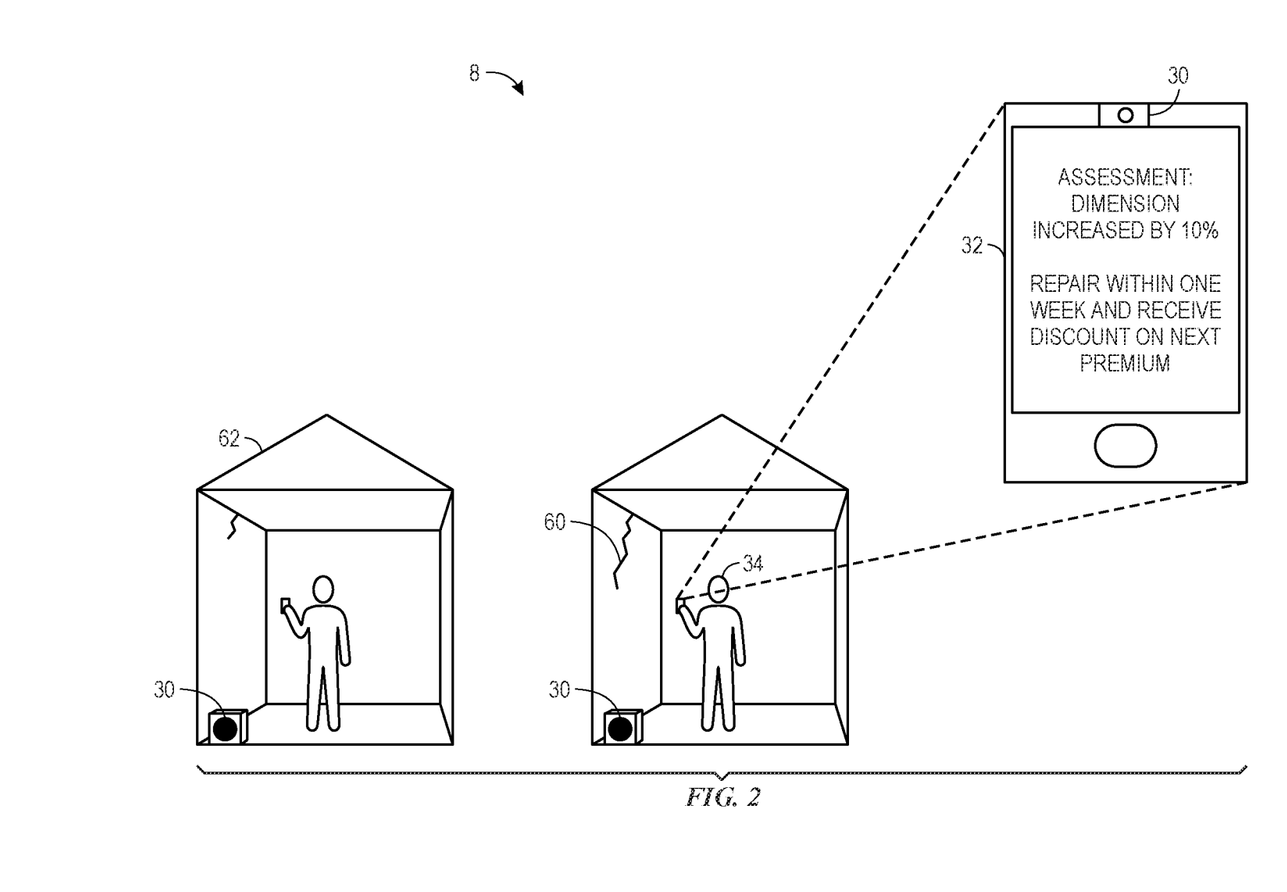
FIG. 2 illustrates the LIDAR system of FIG. 1 that is configured to monitor changes to the condition of the property over time, in accordance with an embodiment of the present disclosure.

The system 8 may also be implemented to track a condition of a property over time, as depicted in FIG. 2. For example, a dwelling 62 of the user 34 may have damage occur in the form of a crack 60 present in a portion of drywall of the dwelling 62. The crack 60 in the drywall may appear minor when visualized by the user 34, but the user 34 may desire to track the progression of the crack 60 in the drywall over time and may want to receive a recommendation on when a repair should be completed. The user 34 may utilize the system 8 to efficiently monitor the progression of the crack 60 in the drywall over time.

For example, the user 34 may utilize the system 8 to analyze the crack 60 in the drywall by directing the one or more LIDAR sensors 30 toward the crack 60 in the drywall so that depth and dimensional data of the crack 60 in the drywall can be attained via the one or more LIDAR sensors 30. The depth and dimensional data relating to the crack 60 in the drywall may be analyzed by the computing system 10. The computing system 10 may identify, from the one or more databases, one or more records for one or more similar properties with similar property condition data (e.g., similar homes with similar cracks). It should be appreciated that the similar properties may include properties of a same type (e.g., residence, vehicle), a similar construction (e.g., pier and beam foundation, concrete slab foundation, brick exterior, wood exterior), and/or in a similar environment (e.g., average temperature, average relative humidity, soil conditions).

The computing system 10 may also access the one or more records information related to respective progression of the similar damage (e.g., the similar cracks in the similar homes) over time. For example, the respective progression of the similar damage may show that, on average, at least one relevant dimension grew at a rate of 2 percent per year and/or that a repair cost increased significantly once the at least one relevant dimension reached a threshold. Using this information, the computing system 10 may then calculate a recommended time window in which a repair should be completed to avoid a significant increase in the repair cost.

The depth and dimensional data corresponding to the crack 60 in the drywall may be stored in the memory 16 of the computing system 10 to enable the progression of the crack 60 in the drywall to be tracked over time. Indeed, the user 34 may use the system 8 to periodically obtain the data for the crack 60 in the drywall over time (e.g., once per month over a year). The computing system 10 may monitor the data and assess the progression (e.g., a rate of growth) to determine the time window for the crack 60 in the drywall. In some embodiments, the system 8 may generate a monitoring schedule (e.g., sampling rate) that is appropriate for the crack 60 (e.g., based on the data for the crack 60 and/or the one or more records in the one or more databases) and may prompt the user 34 to use the system 8 to collect LIDAR sensor data for the crack 60 in the drywall at certain times (e.g., according to the monitoring schedule; again after a preset or predetermined amount of time). As noted above, the one or more LIDAR sensors 30 may be mounted within the dwelling 62, and thus, the computing system 10 may instruct the one or more LIDAR sensors 30 to automatically collect the LIDAR sensor data at the certain times. For example, upon initial detection of the crack 60 or once the crack 60 has certain characteristics (e.g., size, is likely to grow), the computing system 10 may recommend that the user 34 mount the one or more LIDAR sensors 30 to monitor the crack 60 and then activate (e.g., turn on) the one or more LIDAR sensors 30 to collect data related to the crack 60 continuously or periodically according to the monitoring schedule.

Similarly, the computing system 10 may control actuators to adjust movement (e.g., rotation, translation) of the one or more LIDAR sensors 30 and then activate the one or more LIDAR sensors 30 to collect data related to the crack 60 continuously or periodically according to the monitoring schedule. For example, the one or more LIDAR sensors 30 may be coupled to one or more autonomous vehicles (e.g., robots, cars, aerial drones), and the computing system 10 may control the actuators to drive the one or more autonomous vehicles to move to a location proximate to the crack 60 at the property and then to activate the one or more LIDAR sensors 30 to capture the data related to the crack 60 periodically according to the monitoring schedule. In such cases, the location of the crack 60 may be logged and/or input during the initial detection of the crack 60 (e.g., via location tracking devices coupled to the one or more autonomous vehicles or otherwise coupled to the one or more LIDAR sensors 30 that are used during the initial detection of the crack 60, via user inputs at mobile device 32) to enable the one or more autonomous vehicles to return to the location at later times.

Further, the computing system 10 may be programmed and/or dynamically controlled (e.g., automatically by the computing system 10 without human input, based on received monitoring schedule(s) and/or the location(s)) and/or remotely controlled (e.g., via the computing system 10, in real-time based one inputs from the user 34 or a remote operator) to travel to different properties according to the respective monitoring schedules for the different properties to efficiently capture the data for each of the different properties over time. For example, the one or more autonomous vehicles may travel to the crack 60 in the dwelling 62 associated with the user 34 at a first time, then the crack 44 in the vehicle 36 associated with the user 34 at a second time, then other damage in the dwelling 62 associated with the user at a third time, and so on for the different properties that have damage that is to be monitored and that are associated with the user 34. In some cases, the one or more autonomous vehicles may be shared by multiple users (e.g., users in one geographic area, such as a neighborhood or city; customers of the insurance provider). In such cases, the one or more autonomous vehicles may travel to the dwelling 62 associated with the user 34 at a first time, then the vehicle 36 associated with the user 34 at a second time, then another dwelling associated with another user, then return to the dwelling 62 associated with the user 34, then another vehicle associated with another user, then return to the vehicle 36 associated with the user, and so on to meet the various monitoring schedules.

The computing system 10 may coordinate control of the one or more autonomous vehicles so that they may capture the data for each target (e.g., monitored damage) at appropriate times according to the various monitoring schedules. In this way, the computing system 10 may reliably and efficiently receive the data to carry out the techniques disclosed herein. To the extent the damage is on exterior surfaces of the properties, the one or more autonomous vehicles may travel to the properties and capture the data without any input from the user 34. In some cases, the one or more autonomous vehicles may have authorization to enter the properties (e.g., via opening an electronic lock) or may notify the user 34 of a time of a visit so that the user 34 can let the one or more autonomous vehicles into the properties. It should be appreciated that the locations of certain properties (e.g., the vehicle 36) may change over time, and thus, the computing system 10 may track the location (e.g., via a global positioning system of the vehicle 36) for such properties. Then, the computing system 10 may update (e.g., continuously or periodically update and/or coordinate) the control signals to the one or more autonomous vehicles based on the current location(s) for all of the properties and the monitoring schedule(s). In this way, the computing system 10 may plan and predict movement of the one or more autonomous vehicles with the one or more LIDAR sensors 30 to capture the data at appropriate, scheduled times. These movable one or more LIDAR sensors 30 are shown on a floor of the dwelling 62 in FIG. 2, and it should be appreciated that these may be fixed and/or rotatably mounted to the floor or may be configured to travel in multiple directions across the floor. The system 8 may be configured to transmit an alert to the mobile device 32 associated with the user 34 and/or to display information on the display 22. As shown, the alert may relate to a percent progression of the crack 60 in the drywall based on the collected LIDAR sensor data. The system 8 may compare the percent progression to an expected percent progression (e.g., based on the one or more records in the one or more databases), and the system 8 may provide the alert in response to the percent progression exceeding the expected percent progression (e.g., exceeding a threshold).

The system 8 may also detect damage in a variety of structures and components of properties corresponding to the user 34. For example, the system 8 may monitor vehicle or home damage, including glass damage, siding damage, brick damage, drywall damage, roof damage, yard damage, and other damage corresponding the properties of the user 34. The system 8 is able to detect damage in a variety of structures by utilizing one or more LIDAR sensors 30 to collect depth and dimensional data, which may correspond to damage and wear to the property. The system 8 may be implemented throughout the property to monitor different systems and components of the property. For example, the system 8 may have multiple LIDAR sensors 30 dispersed throughout the property in stationary positions to monitor the condition or wear on the property over time. The system 8 may also be implemented in a handheld device or in combination with a user's own electronic device, if a LIDAR sensing mechanism is present in or coupled to the user's 34 electronic device. A software component may interface with the user's electronic device to provide condition of property data based on LIDAR sensor data detected by the user's 34 electronic device.

The system 8, in addition to including a handheld user-operated device, may be incorporated into a mobile phone or other electronic device of the user 34 and/or may be incorporated into a permanent monitoring system at a property and/or may be incorporated into one or more autonomous vehicles. For example, the system 8 may be mounted and/or attached to the roof of a dwelling (e.g. house or apartment building) or any other property type. The system 8 may include a rotating mechanism (e.g., actuator) so that the system 8 may be programmed to send signals to the rotating mechanism to physically scan or rotate the system 8 about the roof of the dwelling over time so that depth and dimensional can be collected for the entire roof via the one or more LIDAR sensors 30 of the system 8. For example, the system 8 may monitor a first portion of the roof (e.g. a specified area of the roof) via the one or more LIDAR sensors 30 over time. The system 8 may then be configured to transmit instructions to rotate the one or more LIDAR sensors 30 to another second portion of the roof to enable the system 8 to collect depth and dimensional data for each of the respective portions of the roof. The system 8 may implement the one or more LIDAR sensors 30 that collect the depth and dimensional data for the roof over time. The computing system 10 can utilize the collected LIDAR sensor data to detect when a portion and/or multiple portions of the roof's collected LIDAR sensor data exceeds a threshold value (e.g., greater than 10 percent of the roof has recesses representative of hail damage) to identify damage or wear to the roof of the property. The system 8 may then provide a repair recommendation for repairing the damage and/or send an alert to an electronic device associated with the user 34 that wear or damage is present, but that a repair is not needed (or is optional or will not result in a significant increase in a repair cost if the repair is delayed) at the current time. The system 8 may then be configured to continuously monitor the portions of the roof over time to detect if the wear condition is worsening to the point where replacement of the roof is recommended (e.g., will result in a significant increase in the repair cost if the repair is delayed). The system 8 may be configured to transmit an alert to an electronic device corresponding to the user 34, and the alert may include information corresponding to the worsening condition of the roof. The system 8 may also send the results of the roof condition to an insurance provider or adjuster to receive feedback on replacement coverage or an amount of coverage that is available for replacement.

The system 8 may also may also identify the characteristics of the roof damage and transmit to the user 34 recommended repairs at different points in time to mitigate or postpone replacement of the roof and/or another component of a property. For example, the system 8 may detect a depth of a chip in the roof tile via the one or more LIDAR sensors 30 of the system 8. The system 8 may then query one or more databases for similar depth data corresponding to roof tile damage and a corresponding repair suggestion for the roof tile damage. The system 8 may then output the suggested repair and the recommended time period for the repair. For example, the system 8 may determine that the depth detected for the roof damage corresponds to a full roof replacement within 10 months. The system 8 may then send a request to the user's insurance provider and/or an alert to an electronic device associated with the user 34 that the user 34 may be entitled to a reward or compensation if the roof replacement is completed within the 10 months, where the reward may include lower insurance premiums corresponding to the user's insurance policy, or another reward associated with a discounted insurance rate. In this way, an incentive may be offered to the user 34 for completion of a repair (e.g., a reduction in an insurance premium for the property; a rebate from an insurance provider).

The system 8 may determine a future predicted condition of the property based on the depth data collected by the one or more LIDAR sensors 30. The system 8 may determine the depth data collected by the one or more LIDAR sensors 30 corresponds to or indicates that the future predicted condition will be reached in a certain time frame based on similar data corresponding to similar properties stored in the one or more databases, as well as an assessment of the progression of the damage at the property to date and/or the respective progression of damage for the similar data in the similar properties over time. The system 8 may be configured to transmit the future predicted condition based on depth data collected for the property and the time frame for the future predicted condition to the user 34. As time progresses, the system 8 may obtain updated data corresponding to the property damage utilizing the one or more LIDAR sensors 30, and the system 8 may dynamically adjust the future predicted condition based on updated depth data.

The system 8 may also predict damage to related property structures based on the changes in collected LIDAR sensor data for the property. For example, based on the collected depth data corresponding to damage of the property, the system 8 may determine based on depth data corresponding to similar properties and as stored in the one or more databases, that other common structures may be affected as the damage worsens. The user 34 may be prompted via an alert to complete the repair more promptly so that other structures of the property are not affected and damage of the property worsens.

The system 8 can further provide updates to an estimated cost of repairs over time if the cost of repairs is expected or estimated to increase as the condition of the property worsens. For example, the system 8 may collect the LIDAR sensor data that can be analyzed to determine the wear for one or more portions of a property. The system 8, based on the depth data, may be configured to retrieve repair cost from the one or more databases. The system 8 may then display a first cost for the repair, if the repair to the property were to be completed when the depth data was first collected (e.g., at a first time). The system 8 may also predict depth data for the property if the repair is not completed and wear continues. The system 8 may then provide a second cost for the repair, if the repair is delayed to a second time based on the predicted depth data at the second time. The system 8 may provide a predicted increased cost of the repair if the user 34 were to postpone the repair to the second time. The wear and corresponding repair cost may be transmitted to the user 34 so that the user 34 may understand the cost of postponing replacement or repair of the property. This may enable the user 34 to make an informed repair decision and weigh the costs of postponing a repair to the property.

It should be appreciated that certain techniques may be automated. For example, the system 8 may be activated to collect the LIDAR sensor data (e.g., to move and/or to turn on the one or more LIDAR sensors 30) in response to the input from the user 34 and/or in response to any other event (e.g., triggering event). For example, the other event may include a weather event (e.g., severe weather indicated by one or more weather data services), an alarm from a security system for the property (e.g., indicating broken glass or other breach of the property), a scheduled time according to the monitoring schedule, or the like. In this way, the system 8 may monitor the property with little to no input from the user 34 at the location of the property. The system 8 may also be used for part manufacturing to specifically fit (e.g., new measurements) of the property that has been damaged.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure. It should be appreciated that features discussed with references to different examples provided herein may be combined. For example, features discussed with reference to the different examples including the vehicle, the dwelling, and the roof may be combined. Additionally, any of a variety of other types of sensors (e.g., optical sensors, such as cameras), may be used in combination with the LIDAR sensors and/or instead of the LIDAR sensors as part of the system to carry out the property assessment techniques disclosed herein.

The invention claimed is:

1. A system, comprising:
one or more processors;
memory storing instructions executable by the one or more processors to cause the one or more processors to:
automatically activate one or more Light Detection and Ranging (LIDAR) sensors to collect sensor data periodically according to a monitoring schedule;
receive the sensor data from the one or more LIDAR sensors, wherein the sensor data comprises a first set of the sensor data indicative of damage to a property at a first time and a second set of the sensor data indicative of the damage to the property at a second time;
determine property condition data related to the damage to the property based on the sensor data, wherein to determine the property condition data comprises calculating a percent change in a dimension of the damage to the property between the first time and the second time based on the first set of the sensor data and the second set of the sensor data;
determine an appropriate repair and a recommended time frame for completion of the appropriate repair based on the property condition data; and
transmit an alert to a device of a user, wherein the alert comprises the percent change in the dimension of the damage to the property.

2. The system of claim 1, wherein the instructions are executable by the one or more processors to cause the one or more processors to transmit the alert to the device of the user in response to the percent change in the dimension of the damage to the property exceeding a threshold.

3. The system of claim 1, wherein the instructions are executable by the one or more processors to cause the one or more processors to instruct display of the appropriate repair and the recommended time frame for completion of the appropriate repair on a display screen.

4. The system of claim 3, wherein the display screen is part of the device of the user.

5. The system of claim 1, wherein the instructions are executable by the one or more processors to cause the one or more processors to update one or more databases based at least in part on the property condition data, wherein the one or more databases are configured to store additional property condition data, additional repair costs, or a combination thereof related to other properties.

6. The system of claim 5, wherein the instructions are executable by the one or more processors to cause the one or more processors to determine the appropriate repair and the recommended time frame for the completion of the appropriate repair by comparing the property condition data related to the damage of the property with the additional property condition data and the additional repair costs related to the other properties stored in the one or more databases.

7. The system of claim 5, wherein the instructions are executable by the one or more processors to cause the one or more processors to determine the appropriate repair and the recommended time frame for the completion of the appropriate repair by utilizing one or more algorithms, wherein the one or more algorithms comprise variables that are dynamically updated based on the additional property condition data, the additional repair costs, or the combination thereof stored in the one or more databases.

8. The system of claim 1, wherein the instructions are executable by the one or more processors to cause the one or more processors to provide an incentive to the user associated with the property in response to the appropriate repair being completed within the recommended time frame.

9. A method, comprising:
   automatically activating, via one or more processors, one or more Light Detection and Ranging (LIDAR) sensors to collect one or more sets of sensor data periodically according to a monitoring schedule;
   receiving, via the one or more processors, the one or more sets of sensor data from the one or more LIDAR sensors, wherein the sensor data comprises a first set of the sensor data indicative of damage to a property at a first time and a second set of the sensor data indicative of the damage to the property at a second time;
   determining, via the one or more processors, depth data associated with the one or more sets of sensor data;
   determining, via the one or more processors, property condition data related to the damage of the property based at least in part on the depth data, wherein determining the property condition data comprises calculating a percent change in a dimension of the damage to the property between the first time and the second time based on the first set of the sensor data and the second set of the sensor data;
   determining, via the one or more processors, an appropriate repair and a cost to repair the damage of the property based at least in part on the property condition data;
   instructing, via the one or more processors, display of a recommendation of the appropriate repair and the cost to repair the damage on a mobile device of a user; and
   transmitting, via the one or more processors, an alert to the mobile device of the user, wherein the alert comprises the percent change in the dimension of the damage to the property.

10. The method of claim 9, wherein the one or more LIDAR sensors are housed in the mobile device.

11. The method of claim 9, wherein the property condition data comprises a property type, dimensions of the damage of the property, a volume of the damage of the property, an impact of the damage on other components of the property, or any combination thereof.

12. The method of claim 9, comprising updating, via the one or more processors, one or more databases based at least in part on the property condition data, wherein the one or more databases are configured to store additional property condition data, additional repair costs, or a combination thereof related to other properties.

13. The method of claim 12, wherein determining the cost to repair the damage of the property comprises comparing the property condition data related to the damage of the property with the additional property condition data and the additional repair costs related to the other properties stored in the database.

14. The method of claim 9 comprising determining, via the one or more processors, that an insurance damage claim related to the damage of the property is fraudulent based at least in part on a comparison between a proposed repair cost and the cost to repair the damage of the property.

15. The method of claim 9 comprising controlling, via the one or more processors, an actuator to move the one or more LIDAR sensors to collect one or more additional sets of sensor data periodically according to the monitoring schedule.

16. A system, comprising:
   one or more processors;
   memory storing instructions executable by the one or more processors to cause the one or more processors to:
      automatically activate one or more Light Detection and Ranging (LIDAR) sensors to collect one or more sets of sensor data periodically according to a monitoring schedule;
      receive the one or more sets of sensor data from the one or more LIDAR sensors, wherein the one or more sets of sensor data indicate damage of a property at a first time;
      determine a recommended repair and a recommended time frame for completion of the recommended repair based on the one or more sets of sensor data;
      receive one or more additional sets of sensor data from the one or more LIDAR sensors, wherein the one or more additional sets of sensor data indicate the damage of the property at a second time;
      determine, based on the one or more sets of sensor data and the one or more additional sets of sensor data, a percent change in the damage of the property between the first time and the second time; and
      determine an updated recommended repair and an updated recommended time frame for completion of the updated recommended repair based on the percent change in the damage of the property.

17. The system of claim 16, wherein the instructions are executable by the one or more processors to cause the one or more processors to reduce an insurance premium for the property in response to completion of the updated recommended repair within the updated recommended time frame.

18. The system of claim 16, wherein the instructions are executable by the one or more processors to cause the one or more processors to control an actuator to move the one or more LIDAR sensors to enable collection of the one or more sets of sensor data at the first time and to enable collection of the one or more additional sets of sensor data at the second time.

* * * * *